(12) United States Patent
Asai

(10) Patent No.: US 7,000,972 B2
(45) Date of Patent: Feb. 21, 2006

(54) SUN VISOR FOR USE WITH VEHICLES

(75) Inventor: Takashi Asai, Toyota (JP)

(73) Assignee: Kyowa Sangyo Co., Ltd., Aichi-Ken (JP)

( * ) Notice: Subject to any disclaimer, the term of this patent is extended or adjusted under 35 U.S.C. 154(b) by 0 days.

(21) Appl. No.: 11/069,648

(22) Filed: Mar. 1, 2005

(65) Prior Publication Data

US 2005/0200155 A1    Sep. 15, 2005

(30) Foreign Application Priority Data

Mar. 2, 2004   (JP) .............................. 2004-057569

(51) Int. Cl.
*B60J 3/00*      (2006.01)

(52) U.S. Cl. .................................. 296/97.11; 296/97.9

(58) Field of Classification Search ............... 296/97.1, 296/97.11, 97.9, 97.12, 97.13
See application file for complete search history.

(56) References Cited

U.S. PATENT DOCUMENTS 6,220,644 B1 * 4/2001 Tiesler et al. ............ 296/97.11

FOREIGN PATENT DOCUMENTS

JP      2-114513      9/1990

* cited by examiner

*Primary Examiner*—Joseph D. Pape
(74) *Attorney, Agent, or Firm*—Conley Rose, P.C.

(57) ABSTRACT

A sun visor includes a lock device (30) that is operable to lock a sun visor body (20) in a storage position adjacent to a vehicle cabin ceiling (1). The lock device (30) is operable to release the sun visor body (20) and to force the sun visor body (20) towards a light-shielding position by a predetermined angle when a locked sun visor body (20) is pressed towards the vehicle cabin ceiling (1). The lock device (30), including a cam ring (50), a spring engaging roller (80), a spring (90), and a lock member (70), may be axially movably fitted on a horizontal rod portion (12) of a support rod (10). The lock device (30) may be used for many types of sun visors, including sliding type sun visors and non-sliding type sun visors.

20 Claims, 9 Drawing Sheets

SUN VISOR FOR USE WITH VEHICLES

This application claims priority to Japanese patent application serial number 2004-57569, the contents of which are incorporated herein by reference.

BACKGROUND OF THE INVENTION

1. Field of the Invention

The present invention relates to sun visors for use with vehicles, such as automobiles. In particular, the present invention relates to sun visors that have a support rod mounted to a ceiling of a vehicle cabin, and a sun visor body that is pivotally mounted to a horizontal rod portion of the support rod. The sun visor body can pivot between a storage position, where the sun visor body is positioned along the vehicle cabin ceiling, and a light-shielding position, where the sun visor body is positioned along a window glass.

2. Description of the Related Art

Conventionally, a sun visor of a type described above is known to have a sun visor body that is stored within a recess formed in a vehicle cabin ceiling. The sun visor body can then be stored in a position along the vehicle cabin ceiling while providing a good appearance of the sun visor body in the stored position.

For such a sun visor, in order to further improve the appearance, it may be advantageous that the potential clearance between the circumferential wall of the recess of the vehicle cabin ceiling and the outer peripheral edge of the sun visor body is set to be as small as possible.

However, if the clearance between the circumferential wall of the recess of the vehicle cabin ceiling and the outer peripheral edge of the sun visor body is set too small, it then becomes difficult for a driver or a passenger to insert a finger or fingers in order to pivot the sun visor body to a light-shielding position.

Therefore, Japanese Laid-Open Utility Model Publication No. 2-114513 (Utility Model Registration No. 2541273) proposes a sun visor that has a lock device disposed between the horizontal rod portion of a support rod and a sun visor body. When the sun visor body is positioned in a storage position and is pressed towards the vehicle cabin ceiling, the lock device is released and the sun visor body is biased so as to pivot the sun visor body by a predetermined angle toward the light-shielding position.

However, in the case of the sun visor of this publication, a spring for producing the biasing force is fitted on the horizontal rod portion of the support rod in a position within the sun visor body. A spring engaging member secured to the horizontal rod portion engages one end of the spring. A retainer member provided on the sun visor body engages the other end of the spring. It is very difficult to incorporate this type of construction to a type of sun visor known as a sliding-type sun visor, in which a sun visor body can be slidably withdrawn along a horizontal rod portion of a support rod.

SUMMARY OF THE INVENTION

It is accordingly an object of the present invention to teach improved sun visors that can be configured as either sliding type sun visors or non-sliding type sun visors by utilizing shared components of lock devices.

According to one aspect of the present teachings, vehicle sun visors are taught that include a support rod, a sun visor body, and a lock device. The support rod has a horizontal rod portion and is adapted to be mounted to a vehicle cabin ceiling. The sun visor body is rotatably mounted on the horizontal rod portion of the support rod so as to pivot between a storage position and a light-shielding position. In the storage position the sun visor body extends along the vehicle cabin ceiling. In the light-shielding position the sun visor body extends along a windshield. The lock device is disposed between the horizontal rod portion and the sun visor body. The lock device serves to lock the sun visor body in the storage position and releases the sun visor body from a lock condition so as to pivot the sun visor body by a predetermined angle towards the light-shielding position when the sun visor body is pressed toward the vehicle cabin ceiling. The lock device includes a cam ring, a spring engaging roller, a spring, and a lock member. The cam ring is fitted on the horizontal rod portion so as to not rotate relative thereto. The cam ring has a circulation path including a lock recess defined therein. The spring engaging roller is rotatably fitted on the horizontal rod portion. The spring has a first spring end engaged with the cam ring, a second spring end engaged with the spring engaging roller, and an intermediate portion defined as a spring force accumulation portion for generating a biasing force used to pivot the sun visor body towards the light-shielding position by a predetermined angle. A lock member is movable relative to and along the circulation path of the cam ring. The lock member engages the lock recess in order to lock the sun visor body in the storage position and is disengaged from the lock recess in order to release the locked condition when the sun visor body is forced to move towards the vehicle cabin ceiling.

With this construction, the locking of the sun visor body in a storage position is released when the sun visor body is pressed towards the vehicle cabin ceiling. The sun visor body is then pivoted by a predetermined angle toward the light-shielding position by the biasing force accumulated in the spring force accumulation portion. Due to this pivotal movement of the sun visor body, a clearance may be provided between the circumference of the sun visor body and the vehicle cabin ceiling. The operator can therefore insert his or her finger(s) into the clearance in order to engage the sun visor body, and manually rotate the sun visor body to a desired light-shielding position. As a result, it is possible to minimize the potential clearance between the circumference of the sun visor body and the circumference of a recess that may be formed in the vehicle cabin ceiling in order to accommodate the sun visor body. It is therefore possible to improve the stored appearance of the sun visor.

In particular, a lock device configured as described above can be easily applied to a non-sliding type of sun visor that is designed such that the sun visor body cannot be slid relative to a horizontal rod portion of a support rod.

In addition, the same lock device can be applied to a sliding-type sun visor by fitting the cam ring and the spring engaging roller of the lock device so that they are axially slidable along the horizontal rod portion of the support rod. Thus, with this configuration, the cam ring, the spring engaging roller, the spring, and the lock member, can be fixed in position relative to the sun visor body during a sliding movement in the axial direction. Consequently, the elements of the lock device can be shared for use among different types of sun visors.

In another aspect of the present teachings, the cam ring and the spring engaging roller of the lock device are slidably movable in an axial direction of the horizontal rod portion of the support rod. The sun visor body is movable so as to be able to be withdrawn along the axial direction of the horizontal rod portion. With this configuration, the lock device can be readily applied to sliding-type sun visors.

In a further aspect of the present teachings, vehicle sun visors are taught that include a bracket, a sun visor having a horizontal rod portion, and a lock device. The bracket is adapted to be mounted to a vehicle cabin ceiling. The bracket rotatably supports the horizontal rod portion so that the sun visor is pivotable between a storage position and a light-shielding position. In the storage position the sun visor body extends along the vehicle cabin ceiling. In the light-shielding position the sun visor body extends along a windshield or window. The lock device is disposed between the bracket and the horizontal rod portion and serves to lock the sun visor body in a storage position. The sun visor body is released from the lock condition and pivots by a predetermined angle toward the light-shielding position when the sun visor body is pressed towards the vehicle cabin ceiling. The lock device includes a cam ring, a spring engaging roller, a spring, and a lock member. The cam ring is fitted on the horizontal rod portion so as to not rotate relative thereto. The cam ring has a circulation path including a lock recess defined therein. The spring engaging roller is rotatably fitted on the horizontal rod portion. The spring has a first spring end engaged with the cam ring, a second spring end engaged with the spring engaging roller, and an intermediate portion defined as a spring force accumulation portion for generating a biasing force used to pivot the sun visor body by a predetermined angle towards the light-shielding position. The lock member is movable relative to and along the circulation path of the cam ring. The lock member engages the lock recess in order to lock the sun visor body in a storage position. The lock member is disengaged from the lock recess in order to release the lock condition when the sun visor body is forced to move toward the vehicle cabin ceiling from the storage position.

Also with this construction, when the sun visor body is pressed toward the vehicle cabin ceiling, the locking of the sun visor body in the storage position is released. The sun visor body is then pivoted by a predetermined angle towards the light-shielding position by the biasing force accumulated in the spring force accumulation portion. Due to this pivotal movement of the sun visor body, a clearance may be provided between the circumference of the sun visor body and the vehicle cabin ceiling. An operator can then insert his or her finger(s) into the clearance in order to engage the sun visor body and to manually rotate the sun visor body to a desired light-shielding position. As a result, it is possible to minimize the potential clearance between the circumference of the sun visor body and the circumference of a recess that may be formed in the vehicle cabin ceiling in order to accommodate the sun visor body. It is therefore possible to improve the appearance of the sun visor in a stored position.

In addition, the lock device can be shared for different types of sun visors, such as those sun visors described in the previous aspects.

According to the above various aspects of the present invention, some of the components of the lock device can be shared for either sliding-type sun visors or non-sliding type sun visors. Therefore, the manufacturing costs for different types of sun visors can be reduced.

DETAILED DESCRIPTION OF THE INVENTION

Each of the additional features and teachings disclosed above and below may be utilized separately or in conjunction with other features and teachings to provide improved sun visors, and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Representative embodiments of the present invention will now be described with reference to the drawings.

First Representative Embodiment

Figure 1:
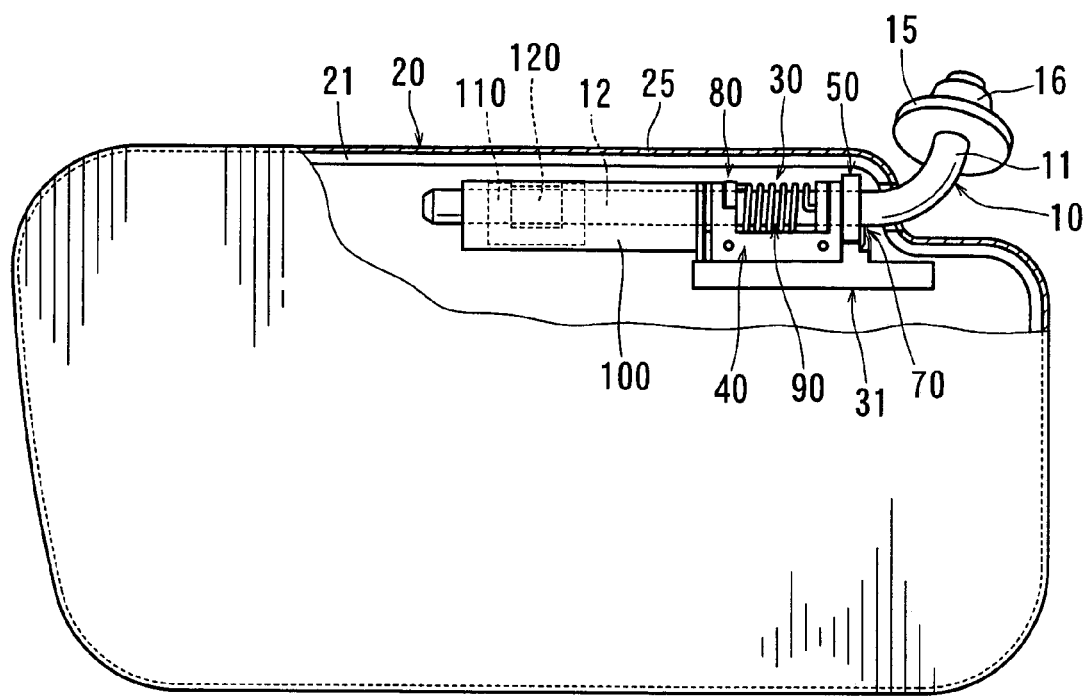
FIG. 1 is a broken-away front view of a sun visor body of a vehicle sun visor according to a first representative embodiment of the present invention.
Figure 2:
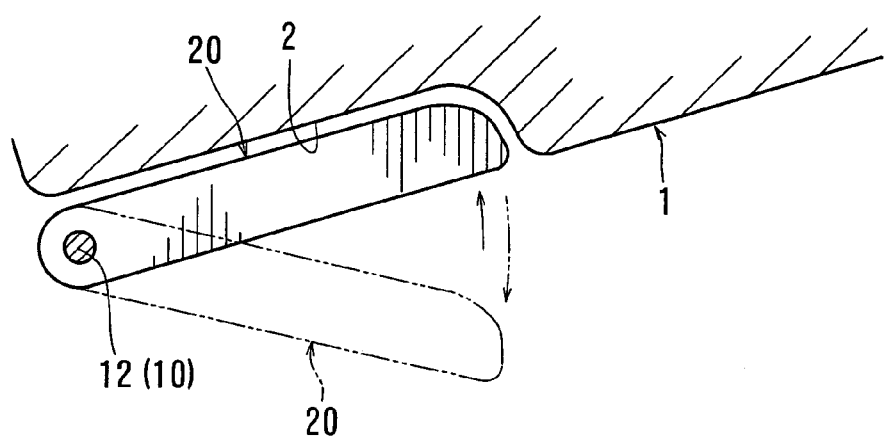
FIG. 2 is an explanatory view showing a state where the vehicle sun visor is mounted to a vehicle cabin ceiling.
Figure 3:
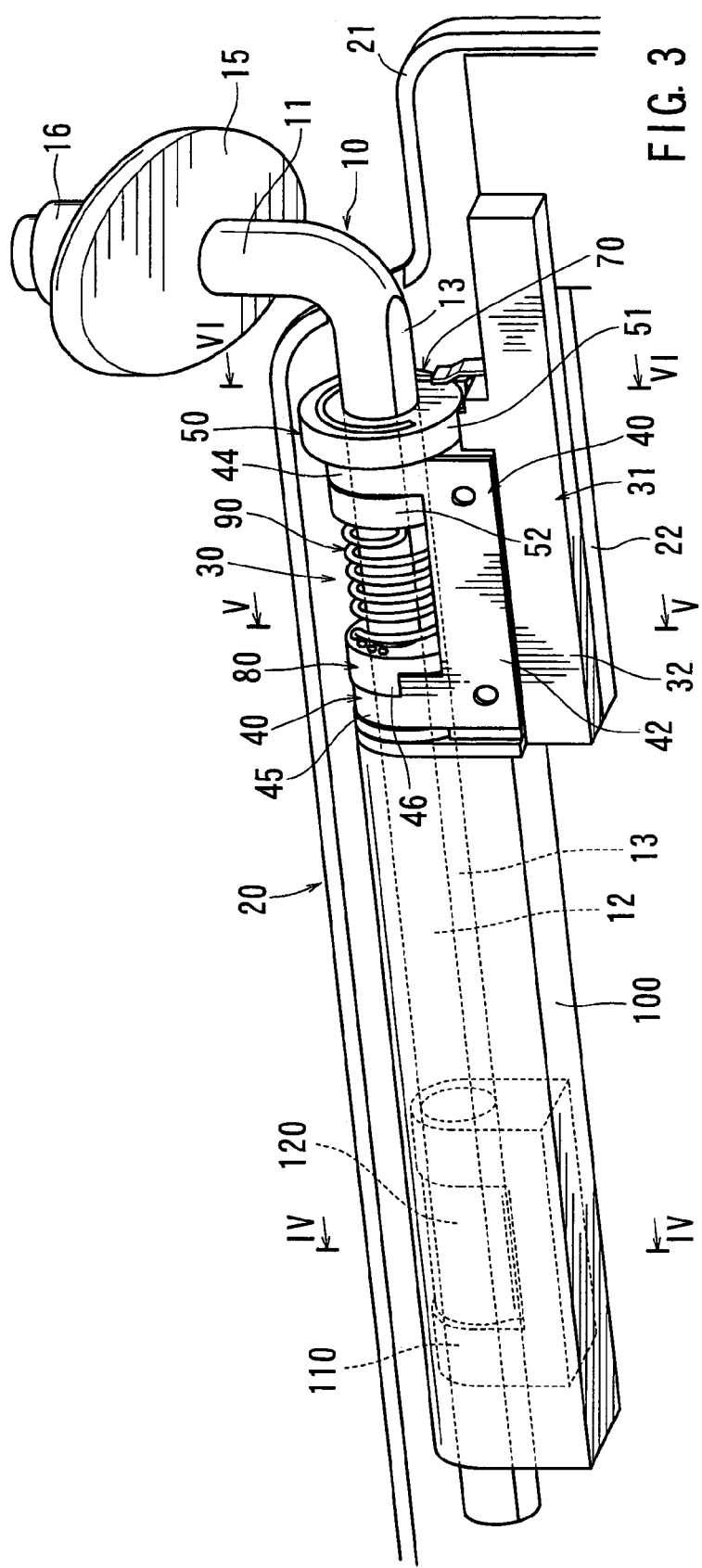
FIG. 3 is a perspective view of the vehicle sun visor and shows the relationship between the sun visor body, a support rod, and a lock device.

A first representative embodiment will be initially described with reference to FIGS. 1 to 10. As shown in FIGS. 1 to 3, a sun visor of this first representative embodiment generally includes a sun visor body 20 and a support rod 10. The support rod 10 has a substantially L-shaped configuration and includes a short vertical rod portion 11 and a long horizontal rod portion 12. The vertical rod portion 11 is mounted to one of the corner portions of a circumferential wall of a recess 2 formed in a vehicle cabin ceiling 1. The vehicle cabin ceiling 1 may be the cabin ceiling of an automobile. More specifically, the vertical support portion 11 is rotatably supported by a boss portion 16 of a bracket 15 that is attached to one of the corner portions of the circumferential wall of the recess 2. A chamfered and flat engaging surface 13 is formed on the outer circumferential surface of the horizontal rod portion 12 and extends along substantially the entire length of the horizontal rod portion 12 in an axial direction.

In this representative embodiment, the sun visor is configured as a sliding-type sun visor. The sun visor body 20 can be withdrawn from along the horizontal rod portion 12 of the support rod 10.

The sun visor body 20 is rotatably and axially movably fitted on the horizontal rod portion 12 of the support rod 10. The sun visor body 20 of this embodiment can be selectively positioned to either of three primary positions including a storage portion, a front light-shielding position, and a right or left side light-shielding position (depending upon the mounting location). In the storage position, the sun visor body 20 may be substantially accommodated within the recess 2 of the vehicle cabin ceiling 1 and may extend along the bottom of the recess 2. In the front light-shielding position, the sun visor body 20 may extend along a window glass (not shown), in particular the front windshield of the vehicle. In the right or left side light-shielding position, the sun visor body 20 may extend along a side window glass (not shown) depending on the mounting position of the sun visor.

Figure 4:
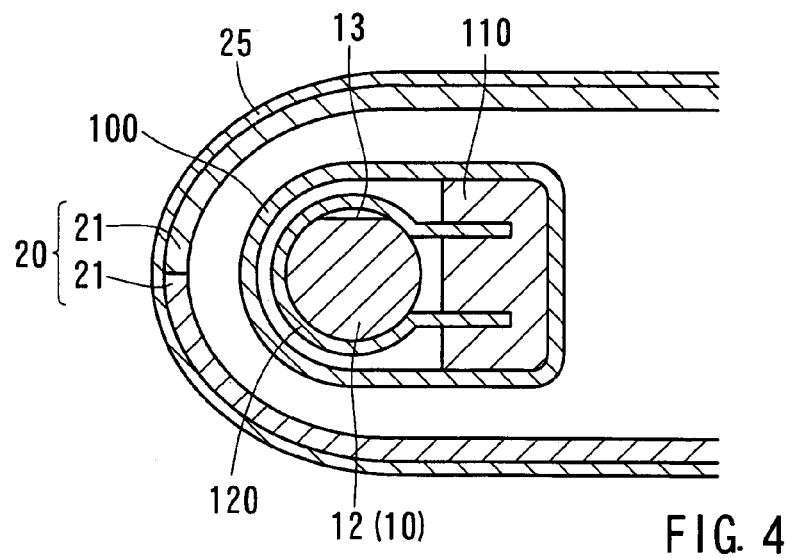
FIG. 4 is a cross-sectional view taken along line IV—IV in FIG. 3.

As shown in FIGS. 3 and 4, the sun visor body 20 has a hollow configuration and may include a pair of shells 21 as major components. The pair of shells 21 corresponds to halves of the sun visor body 20 divided with respect to the direction of thickness. Both shells 21 of the pair are joined to each other in such a manner that the shells 21 are firmly and securely attached. The shells 21 may be made of thermoplastic resin for example. A surface layer material 25 is coated so as to cover the sun visor body 20.

Referring to FIG. 1, a lock device 30 is disposed between the horizontal rod portion 12 of the support rod 10 and the sun visor body 20 so as to be accommodated within the sun visor body 20. The lock device 30 is operable to lock the sun visor body in a storage position. In addition, when a sun visor body 20 in a storage position is pressed against the vehicle cabin ceiling 1, the lock 30 is operable so as to release the sun visor body 20 and to bias the sun visor body 20 so as to pivot the sun visor body 20 by a predetermined distance towards a light-shielding position.

In this first representative embodiment, the lock device 30 includes a casing 40, a cam ring 50, a spring engaging roller 80, a spring 90, and a lock member 70. The components of the lock device 30, together with a lock device mount 31 to which the components of the lock device 30 are mounted, are disposed within one of the corner portions of the sun visor body 20 around the horizontal rod portion 12.

As shown in FIGS. 3, 5, 6 and 10, the lock device mount 31 includes a fixing portion 32, a support portion 33, and a fitting and fixing portion 35, which are all integrally formed with each other. The fixing portion 32 is fixedly clamped between a pair of retaining portions 22 that respectively extend from opposing inner walls of the shells 21 at predetermined positions. The support portion 33 is positioned above the fixing portion 32 (to the left in FIGS. 5 and 6) and serves to support the lower circumferential portions of the cam ring 50 and the spring engaging roller 80. The fitting and fixing portion 35 is positioned at one end of the fixing portion 32 or the support portion 33, and is fixedly fitted into one end of a slide guide tube 100, which will be explained later.

Figure 10:
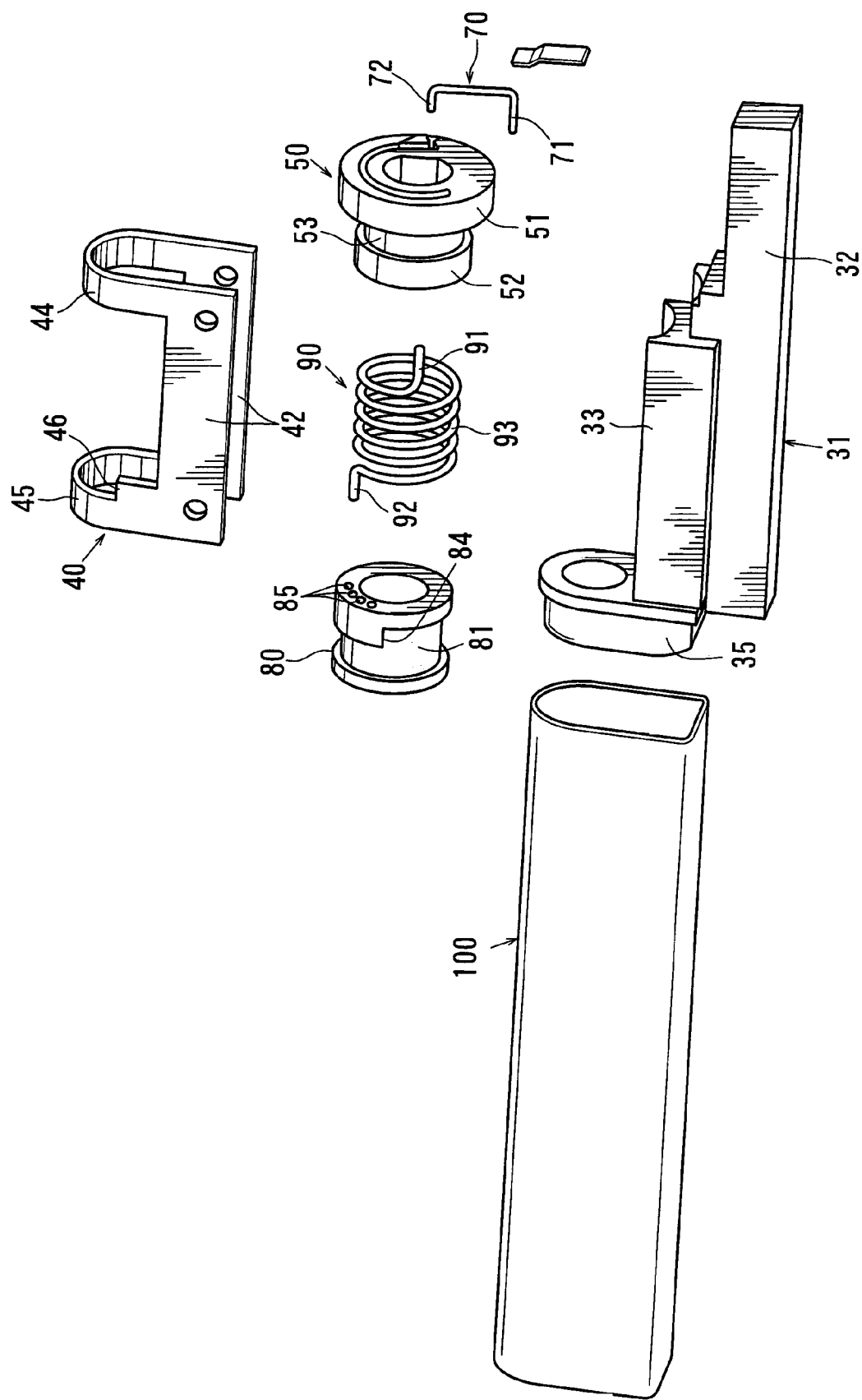
FIG. 10 is an exploded perspective view of various components of the lock device.

As shown in FIGS. 3 and 10, the casing 40 of the lock device 30 is mounted to the lock device mount 31. The casing 40 serves to cooperate with the support portion 33 in order to support the cam ring 50 and the spring stopper roller 80. The casing 40 also has a pair of opposing sidewalls 42, a cam ring guide 44, and a roller guide 45, which are formed integrally with each other.

The opposing sidewalls 42 of the casing 40 are fixed to opposing side surfaces of the support portion 33 of the lock device mount 31 via suitable fixing methods, such as screws, adhesive, snap fits, and heat crush pins.

The cam ring guide 44 of the casing 40 is positioned at one end of the casing 40. The cam ring guide 44 has a substantially inverted U-shaped configuration, which has leg portions extending upward from the respective sidewalls 42. The cam ring guide 44 cooperates with the support portion 33 of the lock device mount 31 in order to support the cam ring 50 such that the cam ring 50 is free to rotate, but is prevented from moving in the axial direction relative to the casing 40.

The roller guide 45 of the casing 40 is positioned at the other end of the casing 40 and has a substantially inverted U-shaped configuration, which also has leg portions extending upward from the respective sidewalls 42. The roller guide 45 cooperates with the support portion 33 of the lock device mount 31 in order to support the spring engaging roller 80 such that the spring engaging roller 80 is free to partially rotate relative to the casing 40, and is prevented from moving in the axial direction relative to the casing 40. An engaging portion 46, in a form of a notch, is formed on a part of the roller guide 45 and serves to transmit the rotation of the sun visor body 20 about the axis of the horizontal rod portion 12 of the support rod 10 to the spring engaging roller 80.

As shown in FIGS. 3 and 10, the cam ring 50 has a large diameter portion 51 and a small diameter portion 52 that have the same central axis and are formed integrally with each other. An annular recess 53 is formed in the outer circumferential surface of the small diameter portion 52. The cam ring 50 is fitted on the horizontal rod portion 12 via a D-shaped axial hole formed in the cam ring 50 that corresponds to the general cross-sectional shape of the horizontal rod portion 12. The cam ring 50 is prevented from rotating relative to the horizontal rod portion 12. However, the cam ring 50 is slidably movable along the axial direction relative to the horizontal rod portion 12. In addition, the cam ring 50 is rotatably supported at the annular recess 53 by the support portion 33 of the lock device mount 31 and the cam ring guide 44.

Figure 6:
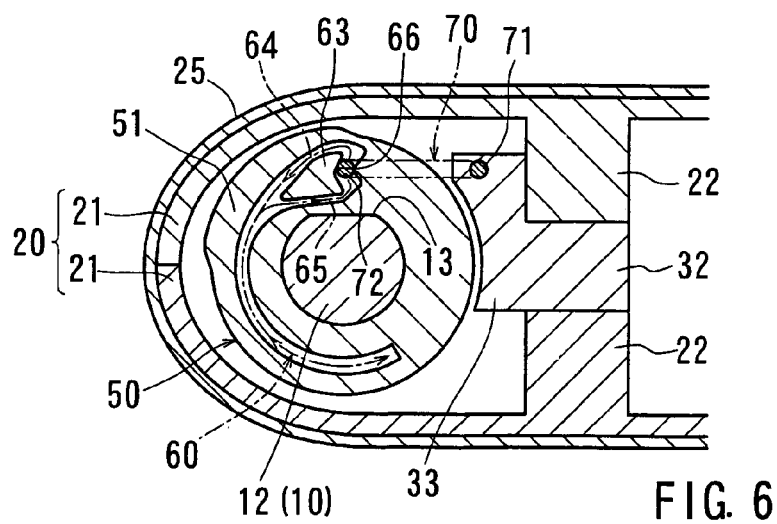
FIG. 6 is a cross-sectional view taken along line VI—VI in FIG. 3.
Figure 7:
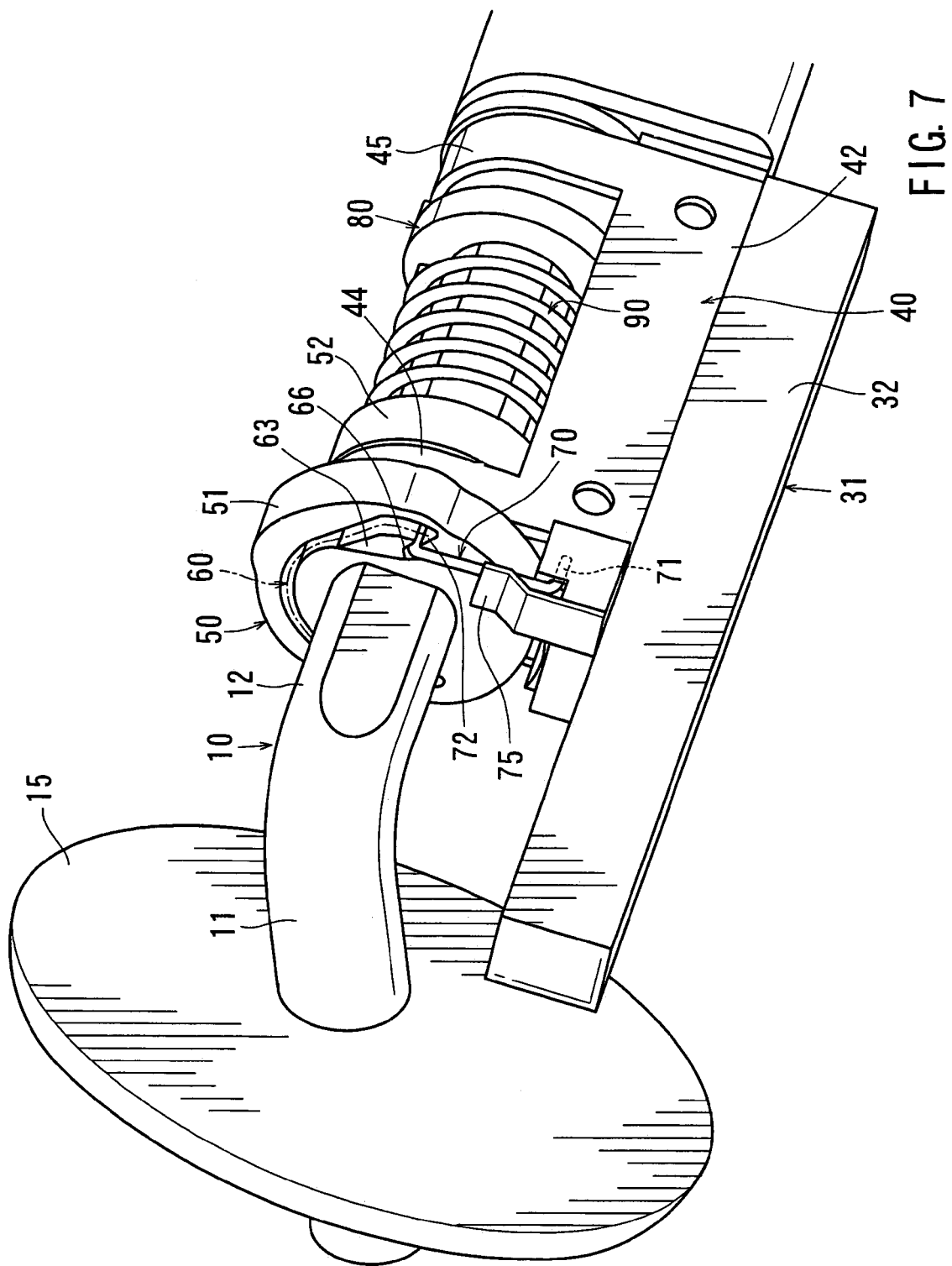
FIG. 7 is an enlarged perspective view showing the mounting state of the lock device to a horizontal rod portion of the support rod.
Figure 8:
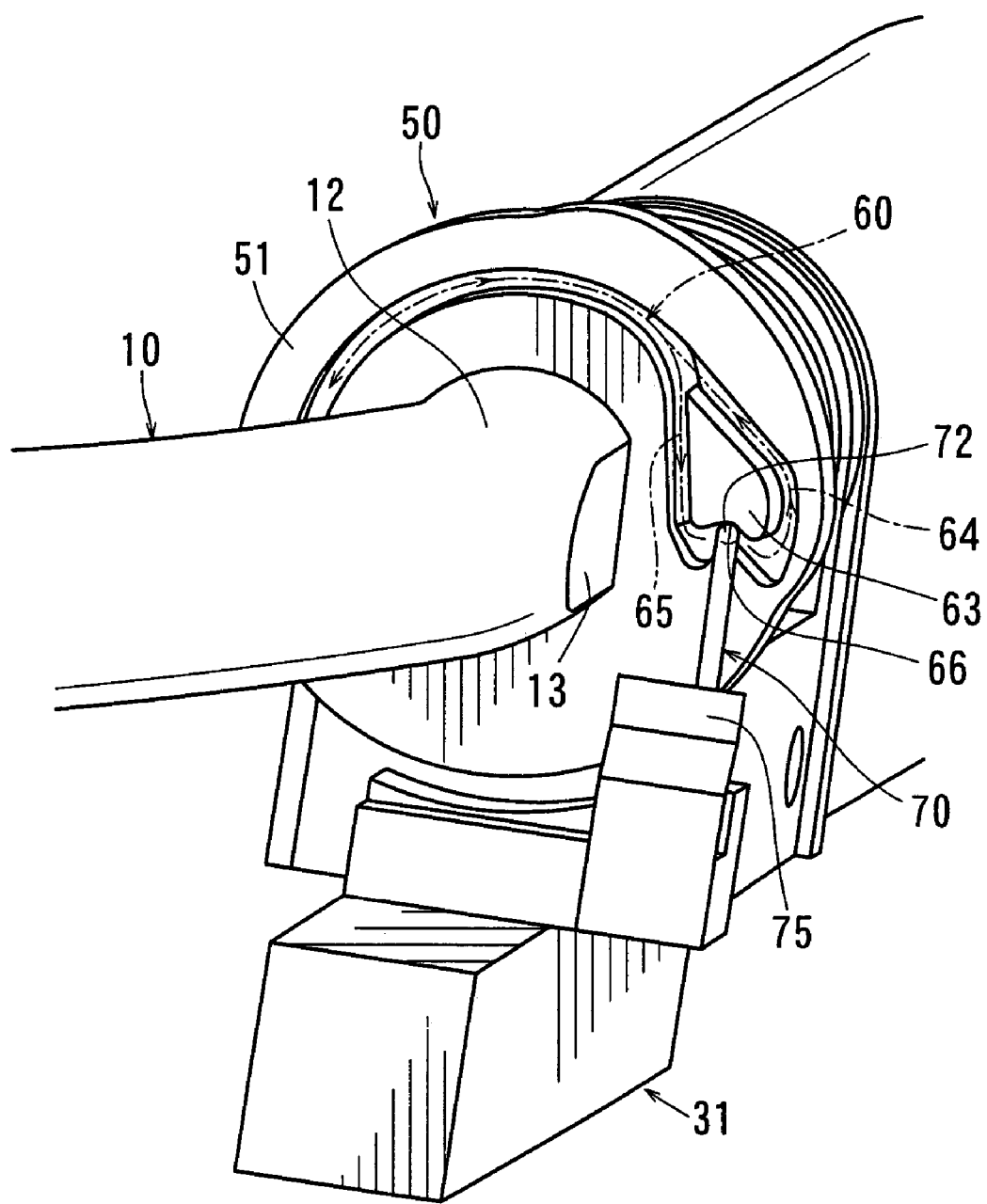
FIG. 8 is an enlarged perspective view showing the relationship between the heart-shaped cam of a cam ring and a lock member of the lock device.

Further, as shown in FIGS. 6 to 8, a heart-shaped cam 63 is defined on an end surface of the large diameter portion 51 of the cam ring 50. More specifically, a recessed circulation path 60 is formed in the end surface of the large diameter portion 51 so as to extend along the circumferential portion of the large diameter portion 51. The recessed circulation path 60 has an end portion including a forward path 64 and a backward path 65 that define the heart-shaped cam 63. In addition, the end portion of the circumferential path 60 includes a lock recess 66 defined at a concave portion of the heart-shaped cam 63. The lock recess 66 provides a boundary between the forward path 64 and the backward path 65.

As shown in FIGS. 7 and 8, the lock member 70 is positioned to oppose an end surface of the large diameter portion 51 of the cam ring 50. The lock member 70 is made of a wire spring that is bent to have a substantially U-shaped configuration. One end of the lock member 70 is defined as a base end 71 and is supported by the lock device mount 31. The other end of the lock member 70 is defined as a lock pin 72 that extends into the circulation path 60 for movement along the circulation path 60.

A holder 75, made of a spring plate for example, is mounted to the lock device mount 31 in order to hold the lock member 70 such that the lock pin 72 always extends into or engages with the circulation path 60. According to this construction, the sun visor body 20 may be locked in a storage position when the lock pin 72 engages the lock recess 66. When the sun visor body 20 locked in a storage position is further pressed against the vehicle cabin ceiling 1, the lock pin 72 may be disengaged from the lock recess 66. Therefore the lock condition is released, as will be explained later.

Figure 5:
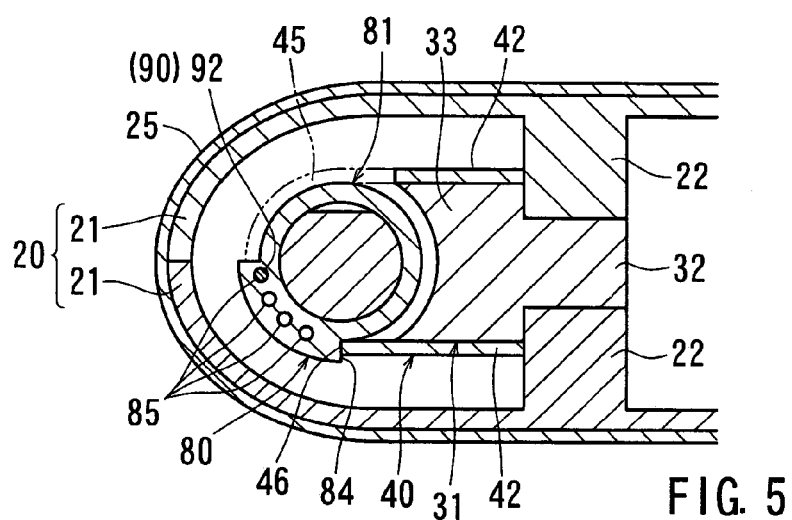
FIG. 5 is a cross-sectional view taken along line V—V in FIG. 3.

As shown in FIGS. 3, 5, and 10, a substantially annular recess 81 is formed in the outer circumferential surface of the spring engaging roller 80 in a substantially central portion with respect to the axial direction. The spring engaging roller 80 is fitted on the horizontal rod portion 12 via an axial hole formed in the spring engaging roller 80. The spring engaging roller 80 is able to rotate and is slidably movable along the axial direction relative to the horizontal rod portion 12. In addition, the support portion 33 of the lock device mount 31 and the roller guide 45 partially rotatably support the spring engaging roller 80 at the annular recess 81.

Further, an engaging portion 84 is defined by a part of the annular recess 81 of the spring engaging roller 80. The engaging portion 84 works together with the rotary stopper portion 46 of the roller guide 45 for transmitting the biasing force (i.e., rotational torque) of the spring 90 to the sun visor body 20, as will be explained later. A plurality of engaging holes 85 are formed in the peripheral portion of an end surface of the spring engaging roller 80 in order to enable the adjustment of the biasing force of the spring 90.

As shown in FIGS. 3 and 10, the spring 90 may be configured as a coil spring. The spring 90 is fitted about the horizontal rod portion 12 in a position between the cam ring 50 and the spring engaging roller 80. More specifically, one end 91 of the spring 90 is inserted into and engaged with an end surface of the small diameter portion 52 of the cam ring 50. The other end 92 of the spring 90 is inserted into and engaged with a desired one of the engaging holes 85. A spring force accumulation portion 93 is defined by the intermediate coiled portion of the spring 90. The spring force accumulation portion 93 serves to accumulate the spring force that is later applied to the sun visor body 20 in order to pivot the sun visor body 20 towards the front light-shielding position by a predetermined angle.

Further, in this first representative embodiment, one end of a slide guide tube 100 is fixedly fitted on the fitting and fixing portion 35, disposed at one end of the lock device mount 31. The slide guide tube 100 extends along the axial direction of the horizontal rod portion 12 and has a tubular configuration with a non-circular cross section in this embodiment.

Figure 9:
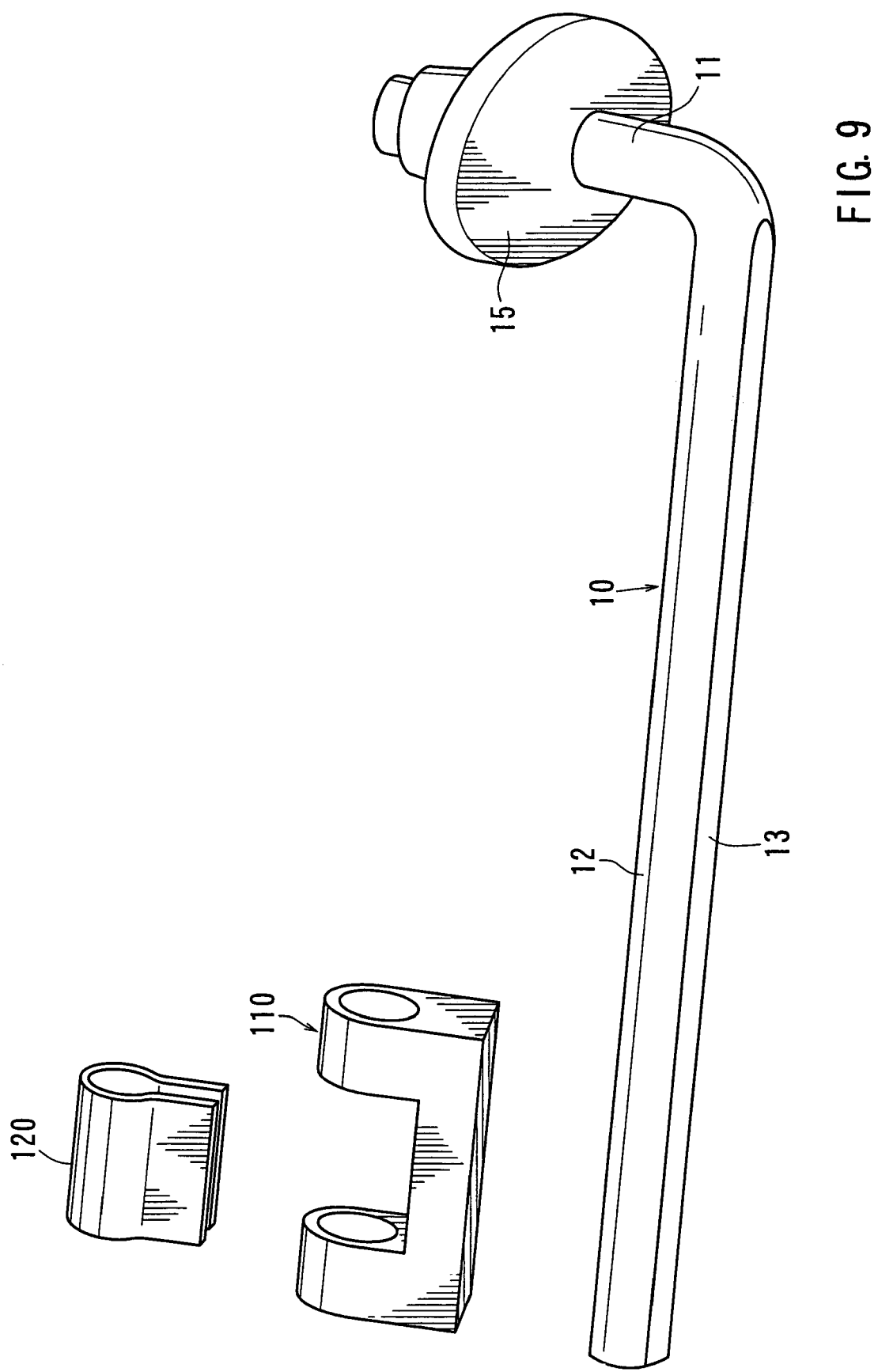
FIG. 9 is an exploded perspective view of the support rod and its associated bearing member and a clip.

As shown in FIGS. 4 and 9, a bearing member 110 is fitted on one end of the horizontal rod portion 12 such that the bearing member 110 is rotatable relative to the horizontal rod portion 12 but is not freely movable along the axial direction. The bearing member 110 is slidably received within the slide guide tube 100. A clip 120, made of spring plate for example, is attached to the bearing member 110 and is resiliently pressed against the outer circumferential surface of the horizontal rod portion 12. The clip 120 produces a frictional force against the horizontal rod portion 12, which frictional force provides an appropriate resistance torque required for operating the sun visor body 20. This is typically enough frictional force to counteract the effects of gravity and allow the visor body 20 to remain in a desired light-shielding orientation.

With a sun visor configured according to the first representative embodiment as described above, the rotary stopper portion 46 of the casing 40 and the engaging portion 84 of the spring engaging roller 80 are in engagement (i.e., contacting for this embodiment) with each other as shown in FIG. 5 when the sun visor body 20 is positioned in a storage position. The storage position is where the sun visor body 20 is positioned along and within the recess 2 formed in the vehicle cabin ceiling 1 as indicated by solid lines in FIG. 2. In the storage position, the spring force necessary for pivoting the sun visor body 20 by a predetermined angle toward the front light-shielding position is accumulated in the accumulation portion 93 of the spring 90. In addition, due to the engagement of the lock pin 72 with the lock recess 66 defined within the heart-shaped cam 63, the sun visor 20 is held or locked in the storage position against the spring force of the accumulation portion 93 of the spring 90 (see FIGS. 6 and 7).

In order to shift the sun visor from the storage position to the front light-shielding position, the operation may press a sun visor body 20 locked in the storage position towards the vehicle cabin ceiling 1. The lock pin 72 is then disengaged from the lock recess 66 as defined within the heart-shaped cam 63. As a result, the locking condition is released. The spring force accumulated in the spring force accumulation portion 93 of the spring 90 is then applied to the sun visor body 20 via the interface between the engaging portion 84 of the spring engaging roller 80 and the rotary stopper portion 46 of the casing 40. As a result, the sun visor body 20 pivots by a predetermined angle towards a front light-shielding position, as indicated by the chain lines in FIG. 2.

Because the sun visor body 20 pivots by a predetermined angle as described above, a clearance may be provided between the outer circumference of the sun visor body 20 and the vehicle cabin ceiling 1. The clearance may enable the operator to insert his or her finger(s) into the resulting opening and manually engage the sun visor body 20. Therefore, the operator can manually pivot the sun visor body 20 to a desired front light-shielding position.

In other words, when the sun visor body 20 is in a storage position it is not necessary to provide a wide enough clearance between the circumference of the sun visor body 20 and the circumferential wall of the recess 2 to enable the insertion of the finger(s) of an operator. The potential clearance between the circumference of the sun visor body 20 and the circumferential wall of the recess 2 can therefore be minimized when the sun visor body 20 is in a storage position. As a result, the storage appearance of the sun visor can be improved.

In addition, in this first representative embodiment, the cam ring 50 and the spring engaging roller 80 of the lock device 30 are axially slidably fitted on the horizontal rod portion 12 of the support rod 10. It is therefore possible to slidably withdraw the sun visor body 20 along the axial direction relative to the horizontal rod portion 12 while the lock device 30 remains disposed within the sun visor body 20.

Further, because the all components of the lock device 30, i.e., the cam ring 50, the spring engaging roller 80, the spring 90, and the lock member 70, are disposed within the sun visor body 20 so as to not be visible from the exterior of the sun visor body 20, the external appearance of the sun visor can be further improved.

In order to move the sun visor body 20 from a front light-shielding position to the right or left side shielding position, the operator may pivot the sun visor body 20 about the vertical rod portion 11. In addition, the sun visor body 20 in the right or left side shielding position may slide along the horizontal rod portion 12 so that sun visor body 20 may be suitably positioned with respect to the side window.

The sun visor body 20 may return from a right or left side light-shielding position to the storage position, where the sun visor body 20 extends along the recess 2 and is substantially accommodated within the recess 2, via a front light-shielding position by the manual operation of the sun visor body 20 in a procedure opposite to the procedure described above. When the sun visor body 20 reaches the storage position, the sun visor body 2 may again be locked in this position.

The second and third representative embodiments will now be described with reference to FIGS. 11 and 12. These representative embodiments are modifications of the first representative embodiment. Therefore, in the second and third representative embodiments, like members are given the same reference numerals as in the first representative embodiment and a description of these members may not be repeated.

Second Representative Embodiment

The second representative embodiment of the present invention will now be described with reference to FIG. 11. This embodiment relates to a sun visor configured as a non-sliding type sun visor. Therefore, a sun visor body 220 of this representative embodiment cannot be withdrawn along the axial direction of a horizontal rod portion 212 of a support rod 210.

Figure 11:
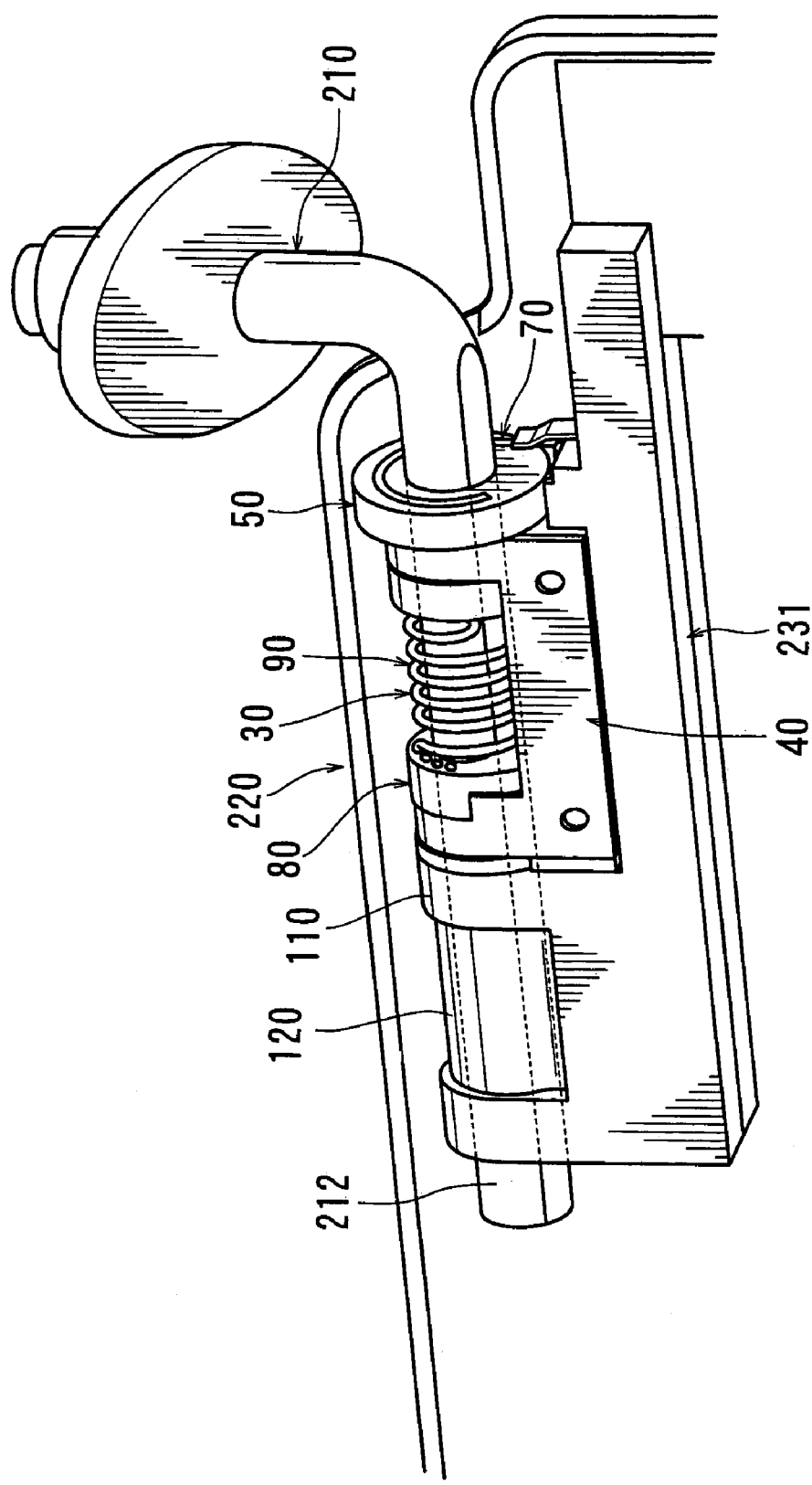
FIG. 11 is a perspective view showing the relationship between a support rod, a sun visor body, a lock device, a bearing member, and a clip of a sun visor according to a second representative embodiment of the present invention.

As shown in FIG. 11, the horizontal rod portion 212 of the support rod 210 may have a length that is shorter than the length required for a sliding type sun visor. In addition, a lock device mount 231 may be formed integrally with the bearing member 110, to which the clip 120 is attached. All of the remaining elements of the lock device mount 231 may be the same as the elements of the lock device 31 of the first representative embodiment. These elements may include the casing 40, the cam ring 50, the spring engaging roller 80, the spring 90, and the lock member 70. The cam ring 50 and the spring engaging roller 80 may be fixed in position in the axial direction relative to the horizontal rod portion 212 of the support rod 210, if necessary.

The other construction is the same as described in the first representative embodiment. Therefore, the second representative embodiment may provide the same operations and effects, with the exception that the sun visor body 220 cannot slide relative to the horizontal rod portion 212.

Third Representative Embodiment

The third representative embodiment will now be described with reference to FIG. 12. This embodiment relates to a sun visor configured as a center-bracket type sun visor. Therefore, in this representative embodiment a center bracket 315 pivotally supports a sun visor body 320 via a pair of left and right horizontal rod portions 312 and 313. The sun visor is able to move between a storage position, where the sun visor body 320 extends along the vehicle cabin ceiling 1 (e.g., in a recess 2 as formed in the previous embodiments), and a light-shielding position, where the sun visor body 320 extends along a windshield (not shown).

Figure 12:
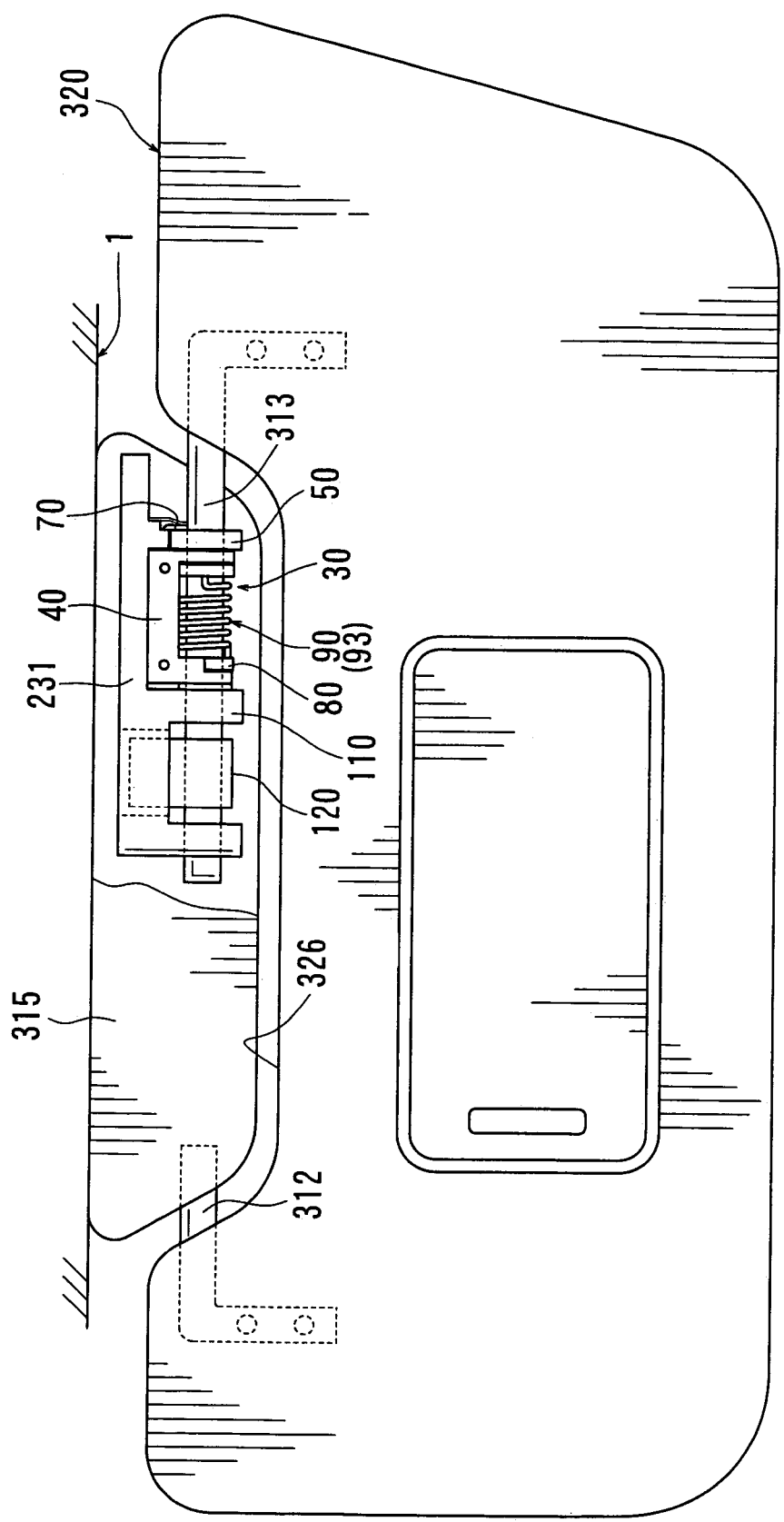
FIG. 12 is an explanatory view showing the relationship between a center bracket, a horizontal rod portion, a sun visor body, and a lock device of a sun visor according to a third representative embodiment of the present invention.

As shown in FIG. 12, a concave wall 326 is formed within the upper central portion of the sun visor body 320 in order to accommodate the center bracket 315. The left and right horizontal rod portions 312 and 313 are fixed relative to the horizontal position of the center bracket 315. The horizontal rod portions 312 and 313 extend from opposing wall portions of the concave wall 326 into the space delimited by the concave wall 326. The horizontal rod portions 312 and 313 are arranged substantially co-axially with one another.

The lock device 30 may be disposed between the center bracket 315 and at least one of the left and right horizontal rod portions 312 and 313 (e.g., in this representative embodiment only one lock device 30 is shown disposed between the center bracket 315 and the right horizontal rod portion 313) in order to lock the sun visor body 320 in a storage position. The lock device 30 functions to unlock the sun visor body 320 and pivot the sun visor body 320 by a predetermined angle towards a light-shielding position when the sun visor body 320 (locked in a storage position) is pressed toward the vehicle cabin ceiling 1. In this representative embodiment, the entire lock device 30 is disposed within the center bracket 315. In addition, a lock device mount 231 may be integrally formed with the bearing member 110, to which the clip 120 is attached.

All of the elements of the lock device 30, including the casing 40, the cam ring 50, the spring engaging roller 80, the spring 90, and the lock member 70, are the same as those described in the first and second representative embodiments.

In this representative embodiment, the cam ring 50 is fitted on the horizontal rod portion 313 so as to not rotate relative to the horizontal rod portion 313. The spring engaging roller 80 is rotatably fitted on the horizontal rod portion 313. In these and other respects, the third representative embodiment is the same as the first representative embodiments.

Similar to the first representative embodiment, one end of the spring 90 is engaged with the cam ring 50 and the other end of the spring 90 is engaged with the spring engaging roller 80. The intermediate portion of the spring 90 is defined as the spring force accumulation portion 93. The spring force accumulation portion 93 provides the biasing force for pivoting the sun visor body 320 towards a light-shielding position by a predetermined angle.

Further, the lock member 70 can move along the circulation path 60 formed in the cam ring 50. The lock member 70 can engage the lock recess 66 defined in the circulation path 60 in order to lock the sun visor body 320 in a storage position. In addition, the locking condition may be released when the sun visor body 320 is further pressed towards the vehicle cabin ceiling 1.

Therefore, the operations and effects of the third representative embodiment are the same as described in the first representative embodiment with the exception that the sun visor 320 cannot slide along the axial direction.

In this way, the elements of the lock device 30, including the spring 90, can be applied to the sliding-type-sun visor (e.g., the first representative embodiment), the non-sliding type sun visor (e.g., the second representative embodiment) and the center bracket type sun visor (e.g., the third representative embodiment). The same lock device can therefore be shared among different types of sun visors. As a result, the manufacturing costs can be reduced.

This invention claims:

1. A vehicle sun visor comprising:
    a support rod having a horizontal rod portion and adapted to be mounted to a vehicle cabin ceiling;

a sun visor body rotatably mounted on the horizontal rod portion of the support rod to pivot between a storage position and a light-shielding position, wherein the sun visor body in the storage position extends along the vehicle cabin ceiling, and the sun visor body in the light-shielding position extends along a windshield;

a lock device disposed between the horizontal rod portion and the sun visor body and arranged and constructed to lock the sun visor body in the storage position and wherein further pressing the sun visor body towards the ceiling releases the sun visor body from the lock condition and pivots the sun visor body by a predetermined angle towards the light-shielding position, wherein the lock device comprises:
 a cam ring fitted on the horizontal rod portion so as to not rotate relative thereto and having a circulation path including a lock recess defined therein,
 a spring engaging roller rotatably fitted on the horizontal rod portion;
 a spring having a first end engaged with the cam ring, a second end engaged with the spring engaging roller, and an intermediate portion defined as a spring force accumulation portion for generating a biasing force to pivot the sun visor body by the predetermined angle toward the light-shielding position,
 a lock member movable relative to and along the circulation path of the cam ring, wherein the lock member engages the lock recess in order to lock the sun visor body in the storage position and is disengaged from the lock recess in order to release the lock condition.

2. The vehicle sun visor as in claim 1,
wherein the cam ring and the spring engaging roller of the lock device are slidably movable along an axial direction of the horizontal rod portion of the support rod; and
wherein the sun visor body is movable so as to be withdrawn along the axial direction of the horizontal rod portion.

3. A vehicle sun visor comprising:
a bracket adapted to be mounted to a vehicle cabin ceiling;
a sun visor having a horizontal rod portion rotatably supported by the bracket so that the sun visor is pivotable at least between a storage position and a light-shielding position, wherein the sun visor body in the storage position extends along the vehicle cabin ceiling, and the sun visor body in the light-shielding position extends along a windshield;
a lock device disposed between the bracket and the horizontal rod portion and arranged and constructed to lock the sun visor body in the storage position and wherein further pressing the sun visor body towards the ceiling releases the sun visor body and pivots the sun visor body by a predetermined angle towards the light-shielding position,
wherein the lock device comprises:
 a cam ring fitted on the horizontal rod portion so as to not rotate relative thereto and having a circulation path including a lock recess defined therein,
 a spring engaging roller rotatably fitted on the horizontal rod portion;
 a spring having a first end engaged with the cam ring, a second end engaged with the spring engaging roller, and an intermediate portion defined as a spring force accumulation portion for generating a biasing force to pivot the sun visor body by the predetermined angle toward the light-shielding position,
 a lock member movable relative to and along the circulation path of the cam ring, wherein the lock member engages the lock recess in order to lock the sun visor body in the storage position and is disengaged from the lock recess in order to release the lock condition.

4. A vehicle sun visor comprising:
a sun visor body;
a support member adapted to be mounted to a vehicle cabin ceiling and arranged and constructed to rotatably support the sun visor body, wherein the support member forms a pivotal axis so that the sun visor body can at least pivot between a first position and a second position about the support member;
a lock device arranged and constructed to temporarily lock the sun visor body in a first position and to permit movement of the sun visor body toward the second position when unlocked;
a biasing device arranged and constructed to bias the sun visor body toward the second position so that when the lock device is unlocked the sun visor body pivots from the first position toward the second position by a biasing force, the biasing device comprising:
 a spring comprising:
  a first spring end, and
  a second spring end;
 a first engaging member engaging the first spring end and mounted to the support member so as to not rotate relative to the support member; and
 a second engaging member engaging the second spring end and rotatably mounted to the support member, and
 a rotary stopper member configured so as to not rotate relative to the sun visor body and engageable with the second engaging member with respect to at least a part of a rotational direction so as to cause deformation of the spring for accumulating the biasing force.

5. The vehicle sun visor as in claim 4, wherein the first and second engaging members are mounted to the support member such that the first and second engaging members are slidable along the support member in the direction of the pivotal axis.

6. The vehicle sun visor as in claim 4, wherein the lock device and the biasing device are disposed within the sun visor body so as to not be readily visible from the exterior of the sun visor body.

7. The vehicle sun visor as in claim 4, further comprising a casing fixedly mounted to the sun visor body and arranged and constructed so as to rotatably support the first and second engaging members relative to the casing, and fixedly support the first and second engaging members in an axial direction relative to the casing.

8. The vehicle sun visor as in claim 7, wherein the rotary stopper member is disposed on the casing opposing the second engaging member in the rotational direction.

9. The vehicle sun visor as in claim 8, wherein the rotary stopper member is integrally formed with the casing.

10. A vehicle sun visor as in claim 4,
wherein the lock device comprises:
 a cam member mounted to the support member so as to not rotate relative to the support member; and
 a lock member comprising:
  a first lock member end, and
  a second lock member end,
  wherein the first lock member end is fixed in position relative to the sun visor body;

wherein the cam member has a cam recess including a lock recess formed therein;

wherein the second lock member end engages the cam recess so that the second lock member end moves relative to and along the cam recess as the sun visor pivots at least between the first and second positions, wherein the second lock member end is temporarily fixed in position by the lock recess when the sun visor is positioned in the first position.

11. A vehicle sun visor as in claim 10, wherein the cam member and the first engaging member are integrally formed with each other.

12. A vehicle sun visor as in claim 11, wherein the support member comprises a support rod adapted to be mounted to the vehicle cabin ceiling;

wherein the support rod includes a horizontal rod portion having the pivotal axis;

wherein the cam member and the first engaging member comprise a cam ring fitted on the horizontal rod portion so as to not rotate relative thereto;

wherein the second engaging member comprises a spring engaging roller rotatably fitted on the horizontal rod portion; and wherein the first position is a storage portion where the sun visor body extends along the vehicle cabin ceiling, and the second position is a light-shielding position.

13. A vehicle sun visor comprising:

a bracket adapted to be mounted to a vehicle cabin ceiling;

a sun visor body;

at least one support member fixed to the sun visor body and rotatably mounted to the bracket such that the sun visor body can at least pivot between a first position and a second position about a pivotal axis formed by the support member;

a lock device arranged and constructed to temporarily lock the sun visor body in a first position and to permit movement of the sun visor body towards the second position when unlocked;

a biasing device arranged and constructed to bias the sun visor body toward the second position so that when the lock device is unlocked the sun visor body pivots from the first position toward the second position by a biasing force, the biasing device comprising:

a spring comprising:
a first spring end, and
a second spring end, a first engaging member engaging the first spring end and mounted so as to not rotate relative to the support member; and a second engaging member engaging the second spring end and rotatably mounted to the support member, and a rotary stopper member mounted so as to not rotate relative to the bracket and to be engageable with the second engaging member with respect to at least a part of a rotational direction to cause deformation of the spring for accumulating the biasing force.

14. The vehicle sun visor as in claim 13, wherein the lock device and the biasing device are disposed within the bracket so as to not be readily visible from the exterior of the bracket.

15. The vehicle sun visor as in claim 13, further comprising a casing fixedly mounted to the bracket and arranged and constructed so as to rotatably support the first and second engaging members relative to the casing, and fixedly support the first and second engaging members in an axial direction relative to the casing.

16. The vehicle sun visor as in claim 15, wherein the rotary stopper member is disposed on the casing to oppose the second engaging member in the rotational direction.

17. The vehicle sun visor as in claim 16, wherein the rotary stopper member is integrally formed with the casing.

18. A vehicle sun visor as in claim 13, wherein the lock device comprises:

a cam member mounted to the support member so as to not rotate relative to the support member; and a lock member comprising:
a first lock member end, and
a second lock member end, wherein the first lock member end is fixed in position relative to the bracket;

wherein the cam member has a cam recess including a lock recess formed therein;

wherein the second lock member end engages the cam recess so that the second lock member end moves relative to and along the cam recess as the sun visor pivots at least between the first and second positions, wherein the second lock member end is temporarily fixed in position by the lock recess when the sun visor is positioned in the first position.

19. A vehicle sun visor as in claim 18, wherein the cam member and the first engaging member are integrally formed with each other.

20. A vehicle sun visor as in claim 19, wherein the support member comprises a horizontal rod portion fixedly mounted to the sun visor body;

wherein the cam member and the first engaging member comprise a cam ring fitted on the horizontal rod portion so as to not rotate relative thereto; and wherein the second engaging member comprises a spring engaging roller rotatably fitted on the horizontal rod portion; and wherein the first position is a storage portion where the sun visor body extends along the vehicle cabin ceiling, and the second position is a light-shielding position.

* * * * *